United States Patent
Leikas

(10) Patent No.: US 7,046,377 B2
(45) Date of Patent: May 16, 2006

(54) METHOD FOR DETERMINING CORRESPONDING POINTS IN THREE-DIMENSIONAL MEASUREMENT

(75) Inventor: Esa Leikas, Espoo (FI)

(73) Assignee: Mapvision Oy Ltd., Espoo (FI)

( * ) Notice: Subject to any disclaimer, the term of this patent is extended or adjusted under 35 U.S.C. 154(b) by 33 days.

(21) Appl. No.: 10/496,144

(22) PCT Filed: Nov. 20, 2002

(86) PCT No.: PCT/FI02/00928

§ 371 (c)(1),
(2), (4) Date: Sep. 9, 2004

(87) PCT Pub. No.: WO03/044460

PCT Pub. Date: May 30, 2003

(65) Prior Publication Data

US 2005/0012056 A1    Jan. 20, 2005

(30) Foreign Application Priority Data

Nov. 21, 2001  (FI) .................................. 20012271

(51) Int. Cl.
*G01N 21/86* (2006.01)
*G01B 11/24* (2006.01)
*G06K 9/00* (2006.01)
*G01C 17/38* (2006.01)

(52) U.S. Cl. ...................... 356/611; 356/614; 356/625; 356/139.03; 356/3.01; 250/559.19; 250/559.2; 250/559.06; 382/150; 382/151; 702/42; 702/152; 702/153; 348/187

(58) Field of Classification Search ................ 356/611, 356/614, 625, 3.01, 5.05, 141.2, 152.1, 139.03; 250/559.19, 559.06, 559.2; 702/150–152; 382/151, 154; 348/187
See application file for complete search history.

(56) References Cited

U.S. PATENT DOCUMENTS

| 4,188,544 A | * | 2/1980 | Chasson ................. 250/559.06 |
| 4,294,544 A | | 10/1981 | Altschuler et al. |
| 4,834,530 A | | 5/1989 | Murai et al. |
| 4,979,815 A | | 12/1990 | Tsikos |
| 5,383,013 A | | 1/1995 | Cox |
| 5,388,059 A | * | 2/1995 | DeMenthon ................. 702/153 |

(Continued)

FOREIGN PATENT DOCUMENTS

EP            0 159 187        10/1985

(Continued)

*Primary Examiner*—Gregory J. Toatley, Jr.
*Assistant Examiner*—Sang H. Nguyen
(74) *Attorney, Agent, or Firm*—Frommer Lawrence & Haug LLP; Ronald R. Santucci

(57) ABSTRACT

The invention relates to connection of corresponding points measured by a computer vision system. The points are indicated by an illuminator (LASER), by means of which several points can be illuminated on the surface of the object at the same time. A camera system (CAM1, CAM2) measures the positions of the points. Using a data system (DTE), projection images are generated from a three-dimensional model of the object, in which images the positions of the points are calculated. To locate the actual point in the image perceived by the cameras, a search is performed in an area in the neighborhood of coordinates calculated from the point in the projection image. The point thus located can be connected to the perceptions of the other cameras by the aid of the projection images. After the corresponding points have been found, the actual three-dimensional coordinates of the measured point are calculated.

9 Claims, 3 Drawing Sheets

Figure 1:
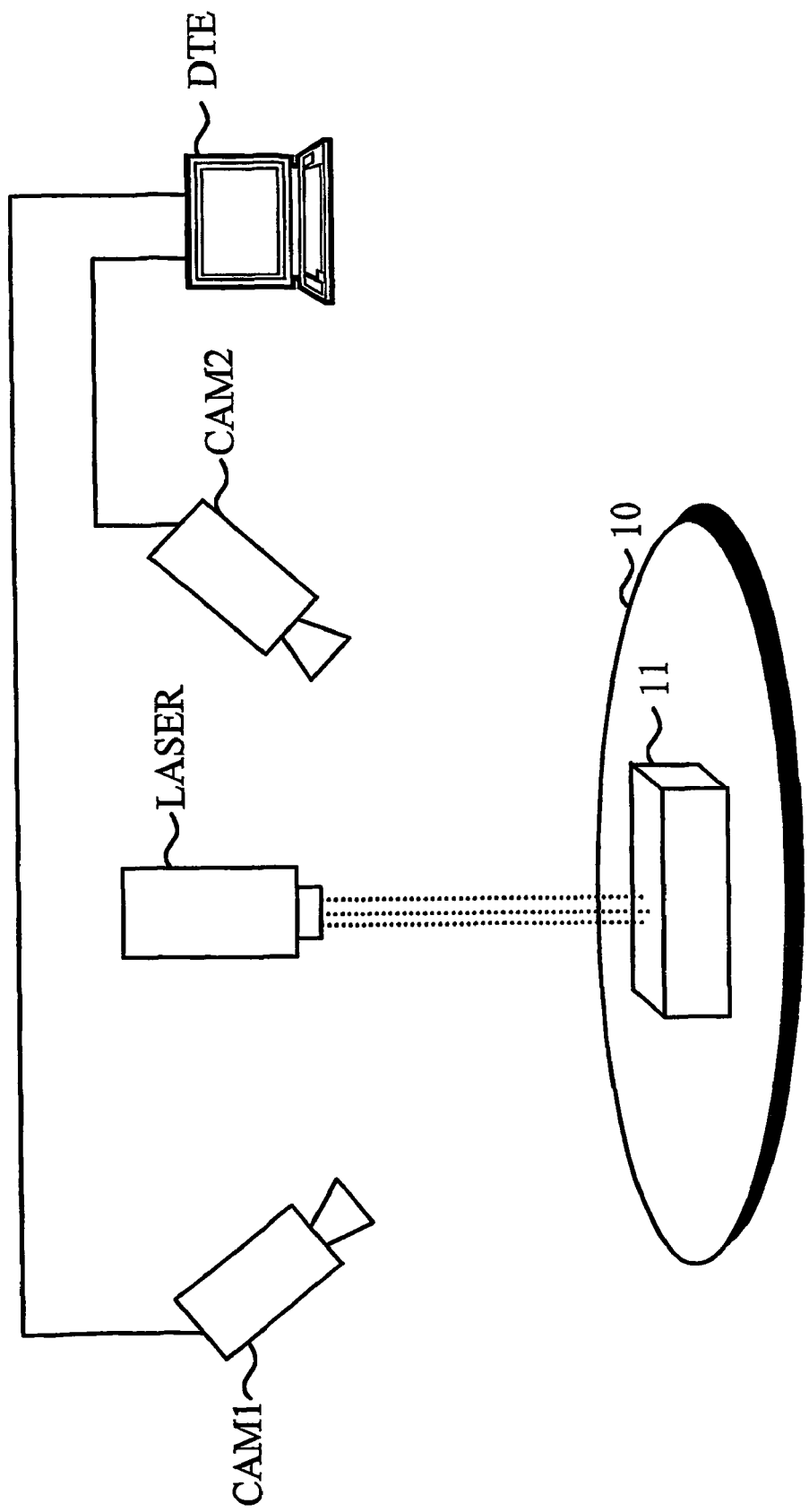

| U.S. PATENT DOCUMENTS | | | | FOREIGN PATENT DOCUMENTS | | |
|---|---|---|---|---|---|---|
| 6,122,065 A | 9/2000 | Gauthier | | EP | 0 348 247 | 12/1989 |
| 6,147,760 A | 11/2000 | Geng | | JP | 2-110789 | 4/1990 |
| 6,173,070 B1 | 1/2001 | Michael et al. | | JP | 10-73419 | 3/1998 |
| 6,414,681 B1 * | 7/2002 | Ohshima et al. ............ 345/428 | | JP | 10-283473 | 10/1998 |
| 6,492,651 B1 * | 12/2002 | Kerekes ................. 250/559.2 | | WO | WO 99/00661 | 10/1999 |
| 6,789,039 B1 * | 9/2004 | Krumm ..................... 702/150 | | | | |
| 6,789,093 B1 * | 9/2004 | Obuchi et al. ........... 707/104.1 | | * cited by examiner | | |
| 6,868,194 B1 * | 3/2005 | Tu et al. .................... 382/312 | | | | |

METHOD FOR DETERMINING CORRESPONDING POINTS IN THREE-DIMENSIONAL MEASUREMENT

This application is a 371 of PCT/FI02/00928 filed on Nov. 20, 2002, published on May 30, 2003 under publication number WO 03/044460 A1 which claims priority benefits from Finnish patent application number FI 20012271 filed Nov. 21, 2001.

FIELD OF THE INVENTION

The present invention relates to three-dimensional measurement. The present invention concerns a method for finding corresponding points in a set of points imaged by different cameras.

BACKGROUND OF THE INVENTION

Computer vision systems are based on information obtained from various measuring devices. Information can be measured using e.g. a laser device, a measuring head or via recognition from an image. The information obtained can be utilized e.g. in quality control systems, where, on the basis of this information, it is possible to determine e.g. the correctness of shape of an object, coloring errors or the number of knots in sawn timber.

A computer vision system is generally formed from cameras. Traditional computer vision systems comprised only one camera, which took a picture of the object. By processing the picture, various conclusions could be drawn from it. By using different algorithms, it is possible to distinguish different levels in images on the basis of their border lines. The border lines are identified on the basis of intensity conversion. Another method of recognizing shapes in an image is to connect it to masks and filters so that only certain types of points will be distinguished from the image. The patterns formed by the points in the image can be compared to models in a database and thus recognized.

In a three-dimensional computer vision system, several cameras are used. To determine a three-dimensional coordinate, an image of the same point is needed from at least two cameras. A truly three-dimensional computer vision system therefore comprises several cameras. The points are usually formed on the surface of the object via illumination. The illumination is typically implemented using a laser. The point is imaged by cameras calibrated in the same coordinate system with the illuminating device, a laser pointer. The same points imaged by different cameras are called corresponding points. When an image of the point can be produced by at least two cameras and corresponding points can be identified, then it is possible to determine three-dimensional coordinates for the point. For the same position, a number of points are measured. The set of points thus formed is called a point cloud.

In earlier methods, point clouds have been formed by illuminating one point at a time, in which case there are no problems regarding recognition of the corresponding point. When only one point on the object surface is visible to the cameras, they are all able to associate the measured data with the same point. Measuring one point at a time means that the pointer has to be moved every time between points, which is why this measuring method is slow.

OBJECT OF THE INVENTION

The object of the invention is to eliminate the abovementioned drawbacks or at least to significantly alleviate them. A specific object of the invention is to disclose a new type of method for connecting corresponding points. A further object of the invention is to improve the reliability of measurement and to accelerate the measuring process by enabling the use of a plurality of simultaneous points.

BRIEF DESCRIPTION OF THE INVENTION

The present invention relates to a method for connecting corresponding points measured by different cameras. A system utilizing the method of the invention comprises at least two cameras and an illuminator used to illuminate points on the surface of the object to be measured. Typically, the illuminator is a laser, but the points can also be illuminated using other types of illuminator producing points that can be measured by imaging with a camera. A number of points are usually illuminated simultaneously by means of a matrix formed from illuminators. In addition, the system comprises a data system, which is used to perform the calculations required for the measurement. The measured results are stored into the data system.

The designed shape of the object to be measured is known beforehand, e.g. on the basis of a CAD model of the object. As the designed shape of the object is known, it is possible to calculate the position or area from which the actual shape of the object is to be measured. After the point has been selected, the illuminator is moved to the desired position and the desired points are illuminated on the surface of the object.

The points illuminated on the surface of the object are imaged by the cameras. The approximate positions of the points can be determined by calculating a projection for each camera separately from the three-dimensional model of the object. The coordinate systems of the projection and the image taken by the camera are identical. Corresponding points between the projections can be calculated on the basis of the three-dimensional model.

In the image perceived by the camera, a corresponding point is found on the basis of the coordinates of the point in the projection. A value or distance is input into the system to define the an area or window around the calculated point that is to be searched to find the actual point imaged by the camera. Instead of a predetermined window, the system may also calculate the size and shape of the window for each point separately. The window may be e.g. a quadrangular or some other pattern, within which a search is performed to locate the point. Once the point is found, it can be connected via the projections to the perceptions of the same point measured by the other cameras. The difference between the actual point and the calculated point consists of a deviation between the calculated and the actual shapes of the object and of a measuring error.

By applying the invention, corresponding points in a set of illuminated points can be connected by a computer vision system. As a benefit of this, the illuminator need not be moved as often as in the traditional solution, in which only one point at a time was illuminated. As a plurality of points can be measured at once, the total time spent on the measurement of the object is reduced considerably. In addition, reliability of measurement is improved because a definitely correct and the same point of each camera image is used to determine the coordinates of the measured point.

LIST OF ILLUSTRATIONS

Figure 2:
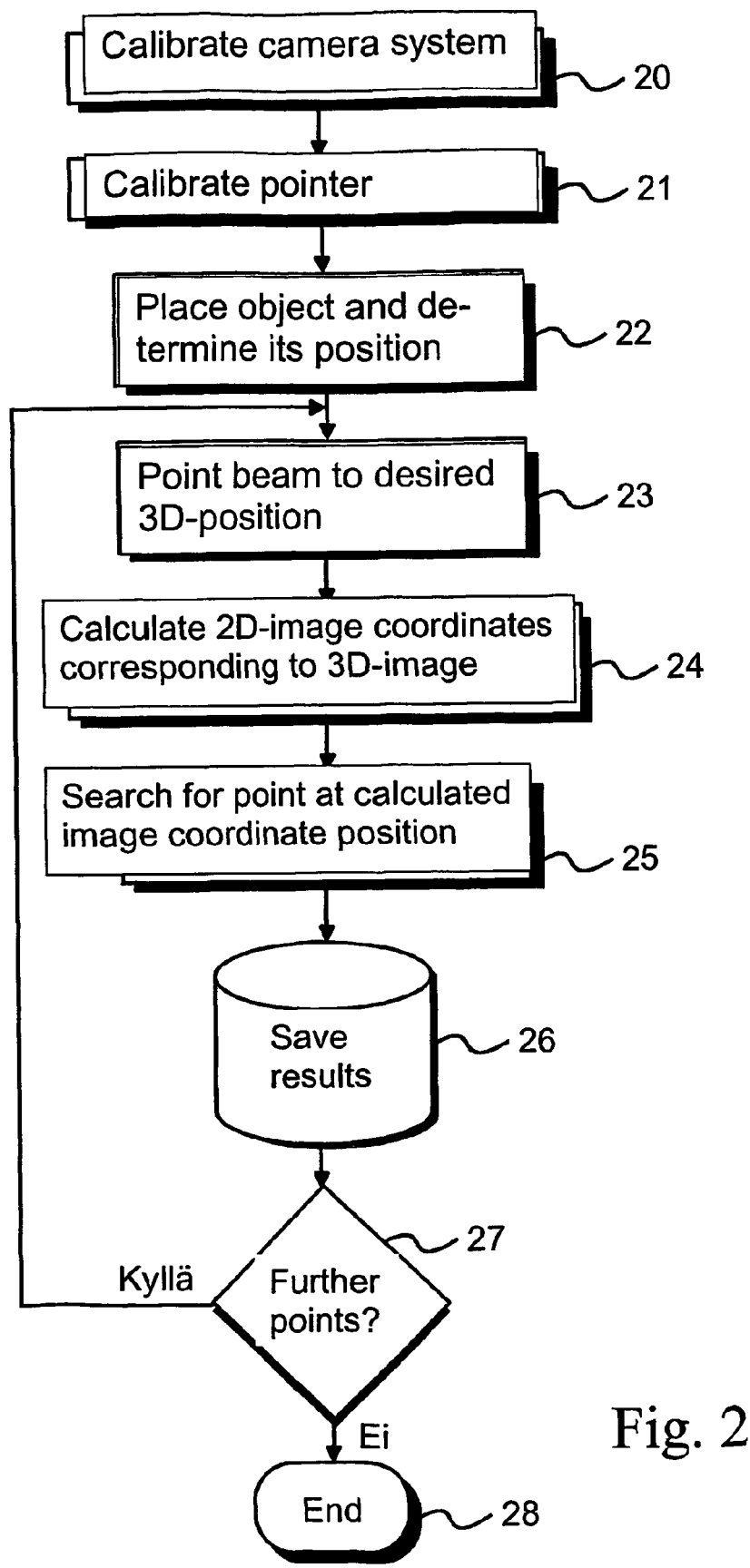
Figure 3:
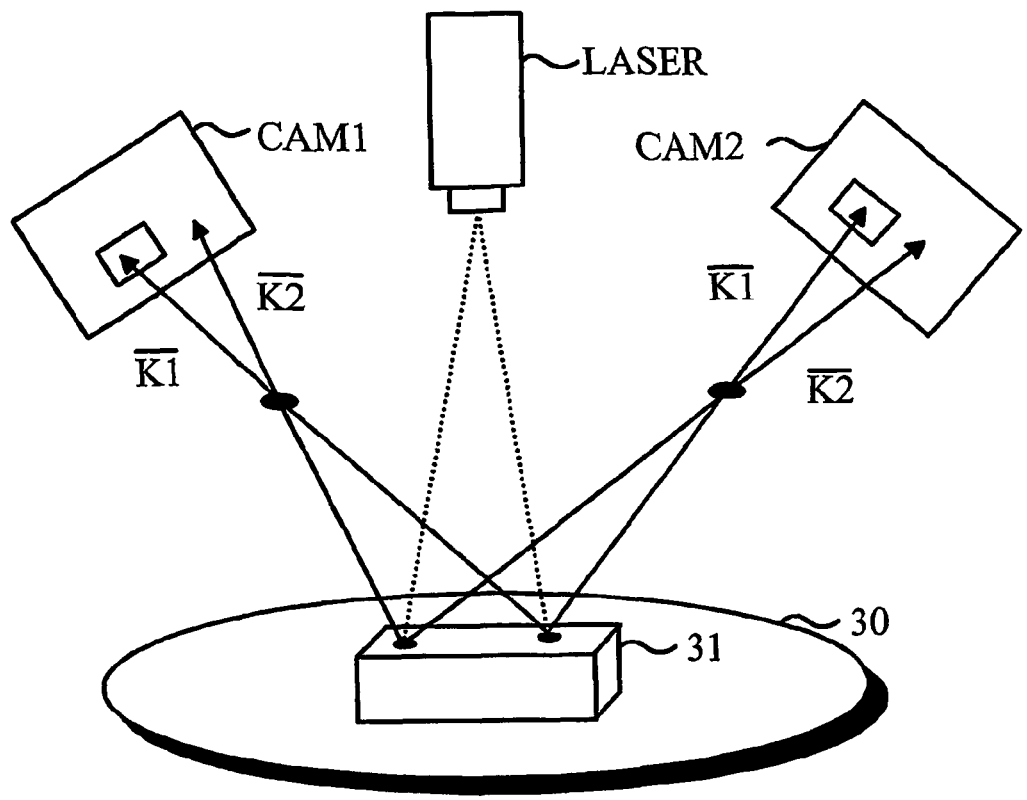
Figure 4:
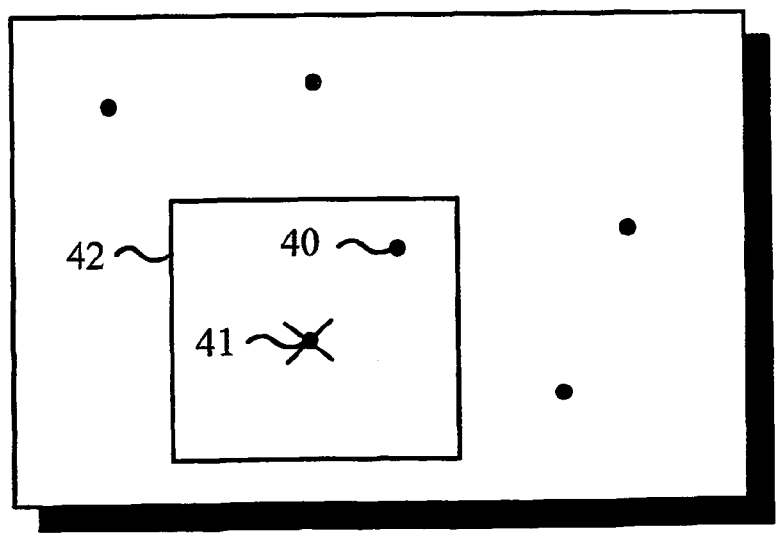

In the following, the invention will be described in detail by the aid of embodiment examples with reference to the attached drawings, wherein FIG. 1 presents an embodiment of the method of the invention, FIG. 2 presents a function diagram representing an embodiment of the method of the invention, FIG. 3 visualizes the operation of the embodiment illustrated in FIG. 1, and FIG. 4 is a more detailed illustration of the process of determining a corresponding point from information imaged by a camera.

DETAILED DESCRIPTION OF THE INVENTION

The system illustrated in FIG. 1 comprises two cameras CAM1 and CAM2, an illuminator LASER and a data system DTE. An object 11 to be measured is placed on a support plate 10.

When the system of FIG. 1 is used, the orientational position of the measuring object 11 is first determined on the basis of the three-dimensional shapes of the object. After the orientational position has been determined, points or areas to be measured are selected on the three-dimensional model of the object. Once the points have been selected, the data system DTE moves the illuminator LASER to the desired position to illuminate the set of points.

By means of the illuminator LASER, points at desired positions are illuminated. The illuminator typically used is a laser. Using one or more laser beams, a number of light points are formed to illuminate the object. Instead of a laser, it is also possible to use other illuminating methods applicable for forming points on the object surface that are visible to a camera. The points illuminated by the illuminator can be shifted by physically moving the illuminator. The illuminated points are typically shifted by directing the beams via movable mirrors. When the mirrors are moved, the positions of the points change although the illuminator remains stationary. This improves the reliability of the system as the position of the illuminator remains unchanged and known.

The illuminated points are imaged by cameras CAM1 and CAM2 calibrated in the same coordinate system with the illuminator. Typically, at least four cameras are used, but even using only two cameras it is possible to measure three-dimensional coordinates. When necessary, the number of cameras can be increased. The images taken by the cameras CAM1 and CAM2 are compared to projections formed from the three-dimensional model. A projection image is a two-dimensional picture representing the object, calculated by the data system DTE from the three-dimensional model of the object as seen from the direction of the camera. The positions of the illuminated points in the projection image are also calculated. From the positions of the points in the projection image, the connection between the cameras CAM1 and CAM2 and the points in the images can also be inferred.

FIG. 2 presents a function diagram of the system illustrated in FIG. 1. A measurement procedure is started by calibrating the cameras of the system to the same coordinate system, step 20. In addition to the cameras, the illuminator used to illuminate points on the surface of the object have to be calibrated as well, step 21. Besides calibration, the preparations for measurement include determination of the position of the object, step 22. The position of the object placed on the support plate can be determined on the basis of its known three-dimensional shapes. Instead of the determination of position, the object can also be fastened to a predetermined location.

Actual measurement is started by illuminating points at desired locations, step 23. The desired locations are selected by the data system, which gives instructions for moving the illuminator. The desired locations can be stored as sequences in the memory of the data system, in which case the same locations are measured on each object. For the measurement, various conditions can be set as criteria on the basis of which the decisions regarding measuring positions or termination of measurement are made. The measurement can be stopped e.g. after a predetermined number of points have been measured on the object.

To allow the position of a point to be determined from the image taken by a camera, the coordinates of the point have to be converted into two-dimensional form, step 24. This is done by calculating from the three-dimensional model a projection image, in which the object is presented two-dimensionally from the direction of the camera. Two-dimensional coordinates of the point can be calculated from the projection image. This is repeated for all cameras in the system.

On the basis of the two-dimensional coordinates picked up from the projection images, a search is carried out to locate the points in the images taken by the cameras, step 25. A certain area, e.g. a window or circle, is formed around the point, whereupon this area is searched to locate the point. The size of the area is defined beforehand. The point thus found in the image can be connected to the calculated point in the projection image. The points thus established constitute a pair of corresponding points, from which the actual three-dimensional coordinates of the point are computed. This is repeated for all points illuminated by the illuminator.

The measured actual three-dimensional coordinates are stored into the memory of the data system, step 26. After this, a check is performed to determine whether it is necessary to measure further points, step 27. If the points have to be shifted to measure additional points, then the procedure is resumed at step 23. Otherwise the measurement is terminated, step 28.

FIG. 3 visualizes the operation of the system 1 presented in FIG. 1. In FIG. 3, points are illuminated on the surface of an object 31 by an illuminator LASER. In the figure, cameras CAM1 and CAM2 are represented as the images produced by them. By means of the data system, projections are calculated for both cameras from the three-dimensional model of the object 31. From the projection images, the position of the selected point can be calculated with reasonable accuracy, because typically the deviation of shape between the object to be measured and the designed model is small. This point is reflected to the cameras CAM1 and CAM2 as shown by vector K1. As the illuminator LASER produces a matrix illuminating several points simultaneously, other points are also visible in the images. In FIG. 3, such a point is reflected to the cameras as shown by vector K2.

On the basis of the coordinates of the projection image, an area in which the point is to be searched for is selected in the images produced by the cameras CAM1 and CAM2. FIG. 4 represents a perception as imaged by the camera. In the projection image, a point 41 is calculated and an area around it is searched to locate the actual point. The calculated points in the projection images can be connected to each other. In the example, the area to be searched is defined as an area 42 of square shape. However, the search area may be of any shape. In this area, the actual point 40 is detected, and this point can be connected to a point on the three-dimensional model by the aid of the calculated point in the projection image. Once the corresponding points have been determined, the actual three-dimensional coordinates of the point are calculated on the basis of them.

In FIG. 4, the difference between points 41 and 40 is exaggerated to visualize the method. In practical situations, where the distance between the illuminated points is large in relation to the deviations of shape of the object, it is always possible to calculate beforehand an image window size such that the same window will not contain another competing point. If necessary, in the calculation of the image window size, use is also made of already existing information regarding the entire shape of the object (e.g. a CAD model). In theory, the same image window may still happen to contain a competing point if there is a large deviation between the actual shape of the object and its designed shape. However, in industrial production such an object is completely defective, and in a measurement situation it will produce deviations exceeding the tolerances in any case.

The invention is not limited to the embodiment examples described above; instead, many variations are possible within the scope of the inventive concept defined in the claims.

The invention claimed is:

1. Method for connecting corresponding points measured by a computer vision system in a set of points, said method comprising the steps of:
   calibrating cameras and illuminator used in a system;
   determining a location and orientational position of an object;
   illuminating points on the surface of the object;
   imaging the illuminated points by the camera system;
   connecting corresponding points imaged by different cameras;
   calculating actual three-dimensional coordinates of the object on the basis of the corresponding points; and
   storing the coordinates in memory;
   wherein the method further comprises the steps of:
   performing a calculation whereby two-dimensional projection points corresponding to the desired measuring points are determined in the images from a three-dimensional model of the object;
   searching an area near the calculated point in the images produced by the cameras to locate the actual point imaged;
   connecting the actual point perceived by different cameras as a corresponding point; and
   repeating the procedure for all the illuminated points.

2. Method according to claim 1, wherein the points to be measured are indicated by illuminating points at positions determined beforehand from the three-dimensional model of the object.

3. Method according to claim 1, wherein the points are moved to measure the shapes of the object.

4. Method according to claim 1, wherein the points are moved by moving the illuminator.

5. Method according to claim 1, wherein the points are moved by directing the beams via movable mirrors.

6. Method according to claim 1, wherein an area of predetermined size and shape around the calculated point is searched to locate the actual point.

7. Method according to claim 1, wherein the predetermined area is a window.

8. Method according to claim 1, wherein the points detected are connected as corresponding points by utilizing coordinate data regarding the points in the projection images.

9. Method according to claim 1, wherein the actual three-dimensional coordinates of the point are calculated on the basis of the corresponding points detected.

* * * * *